United States Patent [19]

Yamada et al.

[11] Patent Number: 4,552,807

[45] Date of Patent: Nov. 12, 1985

[54] MAGNETIC RECORDING MEDIUM

[75] Inventors: Yasuyuki Yamada; Takahito Miyoshi; Toshimitsu Okutsu; Masaaki Fujiyama, all of Odawara, Japan

[73] Assignee: Fuji Photo Film Co., Ltd., Ashigara, Japan

[21] Appl. No.: 496,202

[22] Filed: May 19, 1983

[30] Foreign Application Priority Data

May 19, 1982 [JP] Japan .................................. 57-83174

[51] Int. Cl.$^4$ ................................................ G11B 5/72
[52] U.S. Cl. ...................................... 428/323; 428/330; 428/336; 428/425.9; 428/694; 428/695; 428/900; 428/409
[58] Field of Search ................ 427/131; 428/694, 695, 428/900, 336, 409, 323, 330, 474.4, 475.2, 477.7, 425.9

[56] References Cited

U.S. PATENT DOCUMENTS

| 4,367,261 | 1/1983 | Miyoshi et al. | 428/900 |
| 4,411,953 | 10/1983 | Miyoshi et al. | 428/694 |
| 4,414,270 | 11/1983 | Miyoshi et al. | 428/694 |
| 4,444,838 | 4/1984 | Yamada et al. | 428/336 |

Primary Examiner—George F. Lesmes
Assistant Examiner—William M. Atkinson
Attorney, Agent, or Firm—Armstrong, Nikaido, Marmelstein & Kubovcik

[57] ABSTRACT

This invention provides a magnetic recording medium, in particular, magnetic recording tape whose coefficient of friction is decreased and running durability is improved without deteriorating the S/N property, which comprises a magnetic layer on one side of a support and a back layer on the other side thereof, the back layer containing a filler dispersed in a binder, characterized in that the binder consists essentially of a cellulose resin, a diolefin- or olefin-type synthetic rubber and a polyisocyanate.

17 Claims, No Drawings

MAGNETIC RECORDING MEDIUM

BACKGROUND OF THE INVENTION

1. Field of the Invention

This invention relates to a magnetic recording medium, and more particularly, it is concerned with a magnetic tape whose coefficient of friction is decreased and travelling durability is improved without lowering the S/N and whose edge band or nick is prevented.

2. Description of the Prior Art

In magnetic recording tapes for audio, video and computers, in general, the surface of the magnetic recording layer is finished smooth so as to improve the sensitivity, in particular, the output in high frequency range. However, such a smooth magnetic recording tape has a tendency that it is not taken up regularly during taking-up or rewinding, thus resulting in a disordered wound state. The use of this magnetic recording tape often results in, due to fluctuation of its tension, deterioration of the tape running property, fluctuation of the output and deformation or breakage of the tape.

In order to ovrcome the above described disadvantage, there has hitherto been proposed a magnetic recording tape provided with a back layer on the surface of a support opposite to the magnetic recording layer, and vinyl chloride-vinyl acetate copolymers have been used as a binder for the back layer. In this case, however, there are still drawbacks that the abrasion resistance or toughness is low, the running durability is unfavourably affected, the coefficient of friction is increased and the tape tends to be doubled, and thus there is room for improvement.

Furthermore, it is well known that when a magnetic recording medium, in particular, magnetic recording tape, provided with a back layer to improve the tape running property or running durability is rolled up or piled up in sheets, the roughness of the back layer is transferred to the surface of the magnetic layer, thus resulting in deterioration of the surface property of the magnetic layer and lowering of the electromagnetic properties, in particular, S/N property of the magnetic recording medium. As a result of thinking much of the running property of the back layer, its surface state is rough so that when the magnetic recording medium is stored or allowed to stand under rolled or piled state, the roughness of the back layer is transferred to the surface of the magnetic layer.

SUMMARY OF THE INVENTION

It is an object of the present invention to provide a magnetic recording medium whose coefficient of friction is not increased and running durability is excellent.

It is another object of the present invention to provide a magnetic recording medium provided with a back layer such that the S/N property of the magnetic recording medium is not deteriorated.

These objects can be attained by a magnetic recording medium comprising a magnetic layer on one side of a support and a back layer on the opposite side thereto, the back layer containing at least one filler dispersed in a binder, characterized in that the binder consists of a cellulose-type resin, diolefin- or olefin-type synthetic rubber and polyisocyanate.

DETAILED DESCRIPTION OF THE INVENTION

The inventors have made various efforts to develop a magnetic recording medium whereby the above described disadvantages can be overcome and thus reached the present invention. That is, the present invention provides a magnetic recording medium having an excellent running durability as well as a high S/N property, which comprises a magnetic recording layer on one side of a support and a back layer on the other side thereof, the back layer containing at least one of fillers dispersed in a binder, characterized in that the binder consists of a cellulose-type resin, a diolefin- or olefin-type synthetic rubber and an isocyanate compound.

Example of the cellulose-type resin used in the present invention are cellulose derivatives such as nitrocellulose cellulose acetate butyrate, cellulose propionate, ethyl cellulose and the like and these cellulose derivatives serve to impart heat resistance, toughness (plasticity) and blocking resistance. Above all, nitrocelullose is more preferable having a molecular weight of 10,000 to 80,000.

Examples of the diolefin or olefin rubber used in the present invention are butadiene rubber, isoprene rubber, chloroprene rubber, acrylate-butadiene rubber, isobutene-isoprene rubber, nitrile-butadiene rubber, nitrile-chloroprene rubber, pyridine-butadiene rubber, styrene-butadiene rubber, styrene-chloroprene rubber, styrene-isoprene rubber, ethylene-propyrene rubber and ethylene-1-butene rubber.

These synthetic rubbers can be used as such without special modification, but are preferably subjected to a modification treatment so as to raise the miscibility or dispersibility with inorganic powders or carbon black or so as to improve the bridge making effect of a bridge making agent.

Such a modification can generally be carried out by, during synthesizing a rubber, adding a suitable amount of a vinyl compound having a polar group to its component monomer and copolymerizing the mixture, thereby incorporating the polar group into the rubber molecule. As the vinyl compound having a polar group, there are used acrylic acid, methacrylic acid, hydroxyethyl acrylate (or methacrylate), maleic acid or its anhydride, fumaric acid, itaconic acid, vinylpyridine, vinylpyrrolidone, N,N-dimethylaminoethyl acrylate (or methacrylate), vinylbenzenesulfonic acid and acryloyl (or methacryloyl)ethyl phosphate. The vinyl compound is generally added in a proportion of 0.1 to 10% by weight, preferably 1 to 5% by weight to the raw material monomer.

Useful examples of the polyisocyanate are 2,4-toylene diisocyanate, 1,6-hexamethylene diisocyanate and triisocyanate (e.g., "Collonate L" manufactured by Nippon Polyurethane Kogyo K.K., reaction product of 1 mole of trimethylolpropane and 3 moles of tolylene diisocyanate).

The composition of the binder, characteristic of the present invention, comprises preferably 20 to 80 parts by weight, more preferably 30 to 60 parts by weight of a cellulose-type resin, 20 to 50 parts by weight, more preferably 30 to 40 parts by weight of a diolefin-type or olefin-type synthetic rubber and 10 to 50 parts by weight, more preferably 20 to 45 parts by weight of a polyisocyanate, based on 100 parts by weight of the total binder composition.

On the other hand, useful examples of the filler used in the binder for the purpose of controlling the surface roughness and electric resistance are inorganic powders such as of carbon black, graphite, tungsten disulfide, molybdenum dislfide, boron nitride, $SiO_2$, $CaCO_3$, $Al_2O_3$, $Fe_2O_3$, $TiO_2$, MnO, ZnO and CaO. Preferably, the filler is used in a proportion by weight of 1 to 4, particularly, 2 to 3 the binder.

As a lubricant for lowering the coefficient of friction of the back layer, improving the tape running property and raising the durability, there can be used fatty acids having 12 or more carbon atoms or esters thereof, silicones and paraffin waxes. Particularly, fatty acids having 18 to 22 carbon atoms are preferable.

The back layer has generally a thickness of 3 μm or less, preferably 2 μm or less and a thickness of 1 μm or less is more preferable for decreasing the transfer of roughness of the back layer to the magnetic layer and thus not deteriorating the S/N property.

Furthermore, the surface roughness of the back layer should be so decreased that it is not transferred to the magnetic layer. As a result of our various studies, it is found that when the surface roughness of a magnetic layer is 0.02 μm or less by average roughness (Ra) about the central line of out off 0.08 mm, the surface roughness of a back layer should be 0.05 μm or less, preferably 0.024 μm or less by Ra.

It is desirable that the grain size of a filler used in the back layer as described above is small within such a range as to hold the tape running property, but at the same time, it is found that the thickness of the back layer has a large influence. That is, it is desirable to make thinner the thickness within such a range as to hold the tape running property and running durability. According to our studies, a thickness of 0.3 to 1.5 μm, particularly 1 μm or less is found preferable for this purpose.

For the provision of a back layer having no influence upon a magnetic layer, the variety and shape of a filler should be chosen with care. For example, carbon black or other inorganic fine grains are used, in particular, considering the size, hardness and shape thereof carefully. The mean grain diameter is preferably 0.01 to 0.5 μm more preferably 0.02 to 0.1 μm. The hardness should be not so high and preferably, 2 to 4, more preferably 2.5 to 3.5 by Mohs Hardness. As a filler capable of satisfying these requirements, ultra-fine calcium carbonate powder is preferable and for example, Homocal D (commercial name, manufactured by Shiraishi Kogyo K.K.) is particularly excellent in miscibility or dispersibility in the binder used in the present invention.

The present invention will be explained in detail with reference to the following examples. It will be obvious to one skilled in the art that various changes and modifications can be made in the components, ratios, operational orders and the like without departing from the spirit of the present invention. Therefore, the present invention should not be construed as being limited to the following examples. In these examples, parts are to be taken as those by weight unless otherwise indicated.

EXAMPLE 1

| | | |
|---|---|---|
| (i) Nitrocellulose (molecular weight 20,000) | 30 | parts |
| (ii) Acrylonitrile-Butadiene Rubber (weight ratio 30:70, mean molecular weight 300,000) | 15 | parts |
| (iii) Polyisocyanate (commercial name: Collonate L manufactured by Nippon Polyurethane KK) | 25 | parts |
| (iv) $CaCO_3$ Powder | 150 | parts |
| (v) Methyl Ethyl Ketone | 650 | parts |

The above described components (i), (ii), (iv) and (v) were adequately ball milled to prepare a coating composition to which component (iii) was then added. The resulting coating composition was coated onto the back side of a magnetic recording tape having a magnetic recording layer on the surface thereof and dried to form a back layer with a thickness of 0.8–1.2 μm.

EXAMPLE 2

| | | |
|---|---|---|
| (i) Cellulose Acetate Butyrate | 15 | parts |
| (ii) Acrylonitrile-Butadiene Rubber (weight ratio 30:70, mean molecular weight 30,000) | 30 | parts |
| (iii) Polyisocyanate (commercial name: Collonate L, manufactured by Nippon Polyurethane KK) | 25 | parts |
| (iv) $CaCO_3$ Powder | 150 | parts |
| (v) Methyl Ethyl Ketone | 700 | parts |

Example 1 was repeated except using the above described composition for the back layer to obtain a magnetic tape.

EXAMPLE 3

| | | |
|---|---|---|
| (i) Nitrocellulose (molecular weight 320,000) | 35 | parts |
| (ii) Acrylonitrile-Butadiene-Acrylic Acid Copolymer (27:70:3 wt %, molecular weight Mw = 230,000) | 20 | parts |
| (iii) Polyisocyanate (commercial name: Collonate L, manufactured by Nippon Polyurethane KK) | 45 | parts |
| (iv) $CaCO_3$ Powder (commercial name: Homocal D, manufactured by Shiraishi Kogyo KK) | 240 | parts |
| (v) Stearic Acid | 5 | parts |
| (vi) Methyl Ethyl Ketone | 960 | parts |

The above described components (i), (ii), (iv), (v) and (vi) were adequately ball milled to prepare a coating composition, to which component (iii) was then added. The resulting coating composition was coated onto the back side of a magnetic recording tape having a magnetic recording layer on the surface thereof and dried to form a back layer with a thickness of 0.8 to 1.2 μm.

EXAMPLE 4

| | | |
|---|---|---|
| (i) Nitrocellulose (molecular weight 70,000) | 35 | parts |
| (ii) Styrene-Butadiene-Acrylic Acid Copolymer (23.5:73.5:5.3 wt %, molecular weight Mw = 200,000) | 20 | parts |
| (iii) Polyisocyanate (commercial name: Collonate L, manufactured by Nippon Polyurethane KK) | 45 | parts |
| (iv) Carbon Black (commercial name: Asahi No. 50, manufactured by Asahi Carbon Seizo KK) | 240 | parts |
| (v) Stearic Acid | 5 | parts |
| (vi) Methyl Ethyl Ketone | 960 | parts |

Example 1 was repeated except using the above described composition for the back layer to obtain a magnetic tape.

EXAMPLE 5

| | |
|---|---|
| (i) Cellulose Propionate (molecular weight 20,000) | 35 parts |
| (ii) Styrene-Butadiene-Hydroxyethyl Acrylate Copolymer (21:70:9 wt %, molecular weight Mw = 250,000) | 20 parts |
| (iii) Polyisocyanate (commercial name: Collonate L, manufactured by Nippon Polyurethane KK) | 45 parts |
| (iv) Carbon Black (commercial name: Asahi No. 50, manufactured by Asahi Carbon Seizo KK) | 240 parts |
| (v) Methyl Ethyl Ketone | 960 parts |

Example 1 was repeated except using the above described composition for the back layer to obtain a magnetic tape.

COMPARATIVE EXAMPLE 1

| | |
|---|---|
| (i) Vinyl Chloride-Vinyl Acetate Copolymer (commercial name: 400X-110A, manufactured by Nippon Zeon KK) | 30 parts |
| (ii) Acrylonitrile-Butadiene Rubber (weight ratio 30:70, mean molecular weight 300,000) | 15 parts |
| (iii) Polyisocyanate (commercial name: Collonate L, manufactured by Nippon Polyurethane KK) | 25 parts |
| (iv) $CaCO_3$ Powder | 150 parts |
| (v) Methyl Ethyl Ketone | 650 parts |

Example 1 was repeated except using the above described composition for the back layer to obtain a magnetic tape.

The sample magnetic tapes obtained in Examples 1-5 and Comparative Example 1 will respectively be called Sample Nos. 1-5 and Comparative Sample No. 6.

COMPARATIVE EXAMPLE 2

| | |
|---|---|
| (i) Cellulose Acetate Butyrate (molecular weight: 50,000) | 30 parts |
| (ii) Polyurethane (from butylene adipate and tolylene diisocyanate, mean molecular weight 40,000) | 15 parts |
| (iii) Polyisocyanate (commercial name: Collonate L, manufactured by Nippon Polyurethane KK) | 25 parts |
| (iv) $CaCO_3$ Powder | 150 parts |
| (v) Methyl Ethyl Ketone | 650 parts |

Example 1 was repeated except using the above described composition for the back layer to obtain a magnetic tape, called Comparative Sample No. 7.

EXAMPLE 6

Example 3 was repeated but changing the proportion of (i) nitrocellulose, (ii) acrylonitrile-butadiene-acrylic acid copolymer and (iii) polyisocyanate as follows:

| | Parts by weight | | | |
|---|---|---|---|---|
| (i) | 40 | 60 | 30 | 50 |
| (ii) | 40 | 30 | 30 | 30 |
| (iii) | 20 | 10 | 40 | 20 |

The thus obtained samples will respectively be called Sample Nos. 8-11.

As to each sample of these magnetic recording tapes, the following various tests were carried out to obtain results as shown in the following table:

TEST METHOD 1

The running durability of a virgin tape and the same tape but after running 100 passes was examined by measuring the incoming tension ($T_1$) and outgoing tension ($T_2$) on a revolving cylinder of a VHS video deck.

Furthermore, the output fluctuation of a virgin tape and the same tape but after running 100 passes was examined.

TEST METHOD 2

Using a virgin tape and the same tape but after running 100 passes, $T_2/T_1$ of a stainless pole (3.3 cm/sec) was examined at the magnetic layer side and back layer side.

TEST METHOD 3

The abrasion state of the back coating surface of a tape and the damage state thereof were examined after running 100 passes through a VHS video deck.

| | Sample No. | | | | | Comparative Sample No. | | | | | |
|---|---|---|---|---|---|---|---|---|---|---|---|
| | 1 | 2 | 3 | 4 | 5 | 6 | 7 | 8 | 9 | 10 | 11 |
| Output Fluctuation of Tape after 100 passes (db) | 0.3 | 0.3 | 0.1 | 0.2 | 0.4 | 1.4 | 1.3 | 0.2 | 0.1 | 0.2 | 0.2 |
| Deck Tension of Virgin Tape ($T_2/T_1$) | 75/33 | 95/39 | 67/35 | 68/35 | 95/35 | 109/43 | 107/42 | 94/38 | 68/36 | 68/35 | 75/35 |
| Deck Tension of Tape after 100 passes ($T_2/T_1$) | 68/35 | 93/40 | 68/35 | 68/35 | 98/40 | 95/30 | 96/33 | 69/33 | 70/35 | 83/36 | 79/34 |
| Under Normal Temperature and Humidity | | | | | | | | | | | |
| $T_2/T_1$ of Virgin Tape | | | | | | | | | | | |
| Magnetic Surface | 2.8 | 2.5 | 2.3 | 2.2 | 2.9 | 3.0 | 3.2 | 2.3 | 2.4 | 2.3 | 2.5 |
| Back Surface | 1.5 | 2.2 | 1.6 | 1.6 | 2.1 | 2.2 | 2.3 | 1.6 | 2.0 | 1.8 | 1.6 |
| $T_2/T_1$ of 100 pass Tape | | | | | | | | | | | |
| Magnetic Surface | 2.4 | 2.8 | 2.3 | 2.2 | 2.7 | 2.8 | 3.0 | 2.3 | 2.3 | 2.4 | 2.4 |
| Back Surface | 1.6 | 2.0 | 1.5 | 1.6 | 2.1 | 1.8 | 1.8 | 1.6 | 1.9 | 1.8 | 1.6 |
| Under Normal Temperature and High Humidity (85% RH) | | | | | | | | | | | |
| $T_2/T_1$ of Virgin Tape | | | | | | | | | | | |
| Magnetic Surface | 2.9 | 3.2 | 2.5 | 2.6 | 3.2 | 3.3 | 3.3 | 2.4 | 2.5 | 2.6 | 2.5 |
| Back Surface | 1.8 | 2.2 | 1.6 | 1.6 | 2.3 | 2.2 | 2.4 | 1.7 | 2.1 | 1.9 | 1.7 |
| $T_2/T_1$ of 100 pass Tape | | | | | | | | | | | |

|  | Sample No. | | | | | Comparative Sample No. | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Magnetic Surface | 2.8 | 3.1 | 2.5 | 2.6 | 2.7 | 3.5 | 3.2 | 2.5 | 2.5 | 2.7 | 2.5 |
| Back Surface | 1.9 | 2.4 | 1.7 | 1.8 | 2.1 | 2.2 | 2.0 | 1.8 | 2.3 | 2.0 | 2.0 |
| Abrasion State | little | little | little | little | little | much | much | little | little | little | little |
| Damage of Tape (edge nick) | No | little | No | No | little | much | much | no | no | no | no |

As can be seen from this table, the magnetic tape each having the back layer containing the binder of the present invention exhibit higher running durability.

What is claimed is:

1. A magnetic recording medium comprising a magnetic layer on one side of a support and a back layer on the opposite side thereto, the back layer containing a filler dispersed in a binder, in which the binder consists essentially of a cellulose-type resin, diolefin- or olefin-type synthetic rubber and polyisocyanate.

2. The magnetic recording medium of claim 1, wherein the back layer has a surface roughness of at most 0.02 μm by Ra.

3. The magnetic recording medium of claim 1, wherein the filler has a mean grain size of at most 0.5 μm.

4. The magnetic recording medium of claim 1, wherein the cellulose-type resin is selected from the group consisting of nitrocellulose, cellulose acetate butyrate, cellulose propionate, ethyl cellulose and mixtures thereof.

5. The magnetic recording medium of claim 1, wherein the diolefin- or olefin-type synthetic rubber is selected from the group consisting of acrylonitrile-butadiene copolymers, acrylonitrile-butadiene-acrylic acid copolymers, styrene-butadiene-hydroxyethyl acrylate copolymers, styrene-butadiene copolymers, butadiene rubbers, synthetic isoprene rubbers, chloroprene rubbers, acrylate-butadiene rubbers, isobutene-isoprene rubbers, nitrile-butadiene rubbers, nitrile-chloroprene rubbers, pyridine-butadiene rubbers, styrene-butadiene rubbers, styrene-chloroprene rubbers, styrene-isoprene rubbers, ethylene-propylene rubbers, ethylene-1-butene rubbers and mixtres thereof.

6. The magnetic recording medium of claim 1, wherein the polyisocyanate is selected from the group consisting of 2,4-tolylene diisocyanate, 1,6-hexamethylene diisocyanate and triisocyanate.

7. The magnetic recording medium of claim 1, wherein the binder consists of 20 to 80 parts by weight of a cellulose resin, 20 to 50 parts by weight of a diolefin- or olefin-type synthetic rubber and 10 to 50 parts by weight of a polyisocyanate, based on 100 parts by weight of the binder.

8. The magnetic recording medium of claim 1, wherein the back layer has a thickness of at most 3 μm.

9. The magnetic recording medium of claim 8, wherein the back layer has a surface roughness of at most 0.024 μm by Ra and the magnetic layer has a surface roughness of at most 0.02 μm by Ra.

10. The magnetic recording medium of claim 1, wherein the back layer contains a lubricant.

11. The magnetic recording medium of claim 10, wherein the lubricant is a fatty acid having 18 to 22 carbon atoms in a proportion of 2.5 to 20 parts by weight to 100 parts by weight of the binder.

12. The magnetic recording medium of claim 1, wherein the filler is at least one inorganic powder.

13. The magnetic recording medium of claim 12, wherein the inorganic powder is carbon black powder.

14. The magnetic recording medium of claim 12, wherein the inorganic powder is calcium carbonate powder.

15. The magnetic recording medium of clam 14, wherein the calcium carbonate powder has a mean grain size of at most 0.5 μm.

16. The magnetic recording medium of claim 14, wherein the back layers has a thickness of at most 3 μm.

17. The magnetic recording medium of claim 16, wherein the back layer has a surface roughness of at most 0.024 μm by Ra and the magnetic layer has a surface roughness of at most 0.02 μm by Ra.

* * * * *